United States Patent [19]

Ogawa

[11] Patent Number: 5,011,518
[45] Date of Patent: Apr. 30, 1991

[54] PERMSELECTIVE MEMBRANE AND PROCESS FOR PRODUCING THE SAME

[75] Inventor: Kazufumi Ogawa, Hirakata, Japan

[73] Assignee: Matsushita Electric Industrial Co., Ltd., Osaka, Japan

[21] Appl. No.: 489,249

[22] Filed: Mar. 5, 1990

[30] Foreign Application Priority Data

Mar. 9, 1989 [JP] Japan ................................. 1-057005

[51] Int. Cl.⁵ ...................... B01D 53/22; B01D 71/28
[52] U.S. Cl. .............................. 55/158; 210/500.36; 210/500.42; 156/630
[58] Field of Search ..................... 55/158; 210/500.27, 210/500.36, 500.42; 156/625, 630, 632, 643, 647, 654, 664

[56] References Cited

U.S. PATENT DOCUMENTS

| | | | |
|---|---|---|---|
| Re. 33,273 | 7/1990 | Speaker | 210/500.27 X |
| 4,591,440 | 5/1986 | Higashimura et al. | 210/500.36 X |
| 4,652,412 | 3/1987 | Chiulli | 210/500.27 X |
| 4,714,481 | 12/1987 | Matsuura et al. | 55/158 |
| 4,758,342 | 7/1988 | Heckmann et al. | 55/158 X |
| 4,851,216 | 7/1989 | Lee | 55/158 X |
| 4,859,215 | 8/1989 | Langsam et al. | 55/158 X |

FOREIGN PATENT DOCUMENTS

| | | | |
|---|---|---|---|
| 60-143815 | 7/1985 | Japan | 55/158 |
| 60-257807 | 12/1985 | Japan | 55/158 |
| 60-261528 | 12/1985 | Japan | 55/158 |
| 61-107922 | 5/1986 | Japan | 55/158 |
| 62-178592 | 8/1987 | Japan | 55/158 |
| 63-214319 | 9/1988 | Japan | 55/158 |
| 63-278526 | 11/1988 | Japan | 55/158 |
| 1-067210 | 3/1989 | Japan | 55/158 |

Primary Examiner—Robert Spitzer
Attorney, Agent, or Firm—Stevens, Davis, Miller & Mosher

[57] ABSTRACT

There are disclosed a permselective membrane in a state of monomolecular polymer film obtained by subjecting a monomolecular film of a substance having at least one polymerizable group and a functional group to polymerization, and a process for producing this permselective membrane. This membrane is useful as a permselective membrane for gases, liquids, etc.

16 Claims, 5 Drawing Sheets

FIG. IA
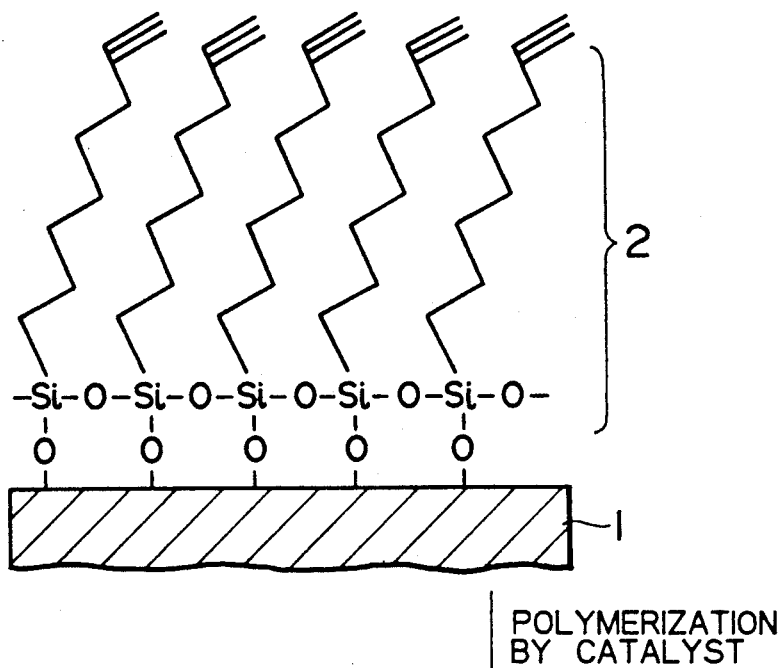
POLYMERIZATION BY CATALYST
FIG. IB
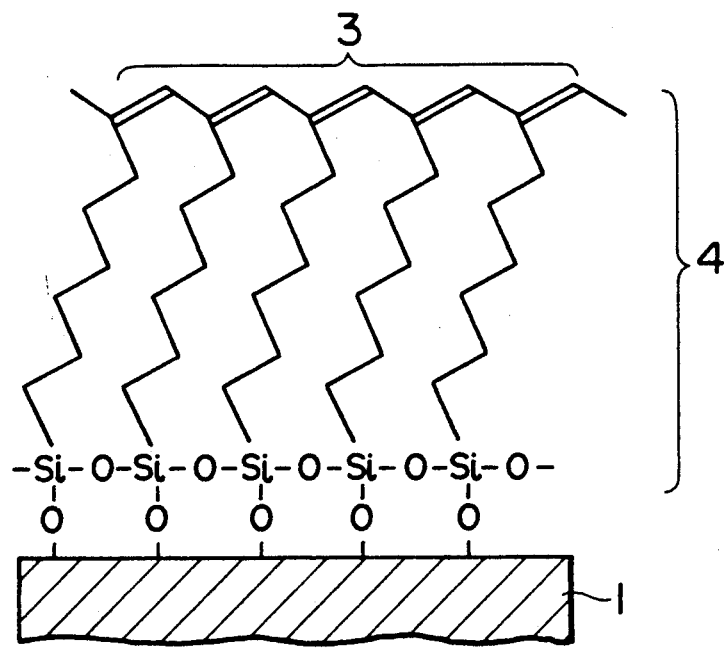

POLYMERIZATION BY CATALYST

ULTRAVIOLET
RAY RADIATION ic film or a monomolecular built-up film formed on a hydrophilic substrate in an organic solvent containing a metal halide catalyst, or by radiation-polymerizing the same, to form a monomolecular polymer film or a monomolecular built-up polymer film, and then etching off a portion of the substrate from the side reverse to the monomolecular film or the monomolecular built-up film.

PERMSELECTIVE MEMBRANE AND PROCESS FOR PRODUCING THE SAME

BACKGROUND OF THE INVENTION

1. Field of the Invention

The present invention relates to an industrial material and more particularly to a perm-selective membrane for gases and liquids and a process for producing the same.

2. Related Art Statement

Conventional permselective membranes are roughly divided into those for gases and those for liquids. Oxygen-enriched membranes are investigated as permselective membranes for gases to improve the combustibility of gases and petroleum fuels. As permselective membranes for liquids, separation membranes for alcohol-water and separation membranes for oil-water are investigated.

However, permselective membranes known at present are produced mainly by coating a porous substrate with a polymer and the surface of the substrate is not smooth. Therefore, when a polymer film is thinned for increasing the selection efficiency, a large number of pinholes are formed, so that only a permselective membrane having a selection ratio of about 4 can be obtained, resulting in low selective-permeation efficiency. Accordingly, various methods are now investigated for raising the efficiency, but a membrane having a sufficient selective permeability has not yet been obtained.

On the other hand, it is known that a built-up film of monomolecular films of a linear hydrocarbon derivative having a chlorosilyl group ($-SiCl_x$) at one terminal can be formed by forming monomolecular films of said derivative in an organic solvent on a hydrophilic substrate surface by chemisorption, and irradiating the monomolecular films with a high-energy beam in an oxygen-containing gas to make the films' surface hydrophilic.

However, there has not yet been proposed a process for producing a permselective membrane having a high selective-permeation efficiency by utilizing the technique described above.

OBJECT AND SUMMARY OF THE INVENTION

It is an object of the present invention to provide a permselective membrane which is excellent in selective permeability and a process for producing the same.

In order to achieve the above object, the present inventors conducted various research projects and consequently found that a permselective membrane in the state of a monomolecular polymer film can be obtained by forming a monomolecular film or a monomolecular built-up film using of a substance having at least one polymerizable group and if necessary a functional group, and carrying out polymerization by means of a catalyst or radiation irradiation, whereby the present invention was accomplished.

By the present invention, there is provided a process for producing a permselective membrane which comprises a step of forming a monomolecular film of a material having at least one polymerizable group and a functional group on a hydrophilic, porous substrate surface, a step of polymerizing the polymerizable group by means of a catalyst or radiation polymerization, and a step of removing a portion of the substrate by etching from the side on which no monomolecular film has been formed.

BRIEF DESCRIPTION OF THE DRAWINGS

FIGS. 1A and B are a schematic view of the steps of the production of a monomolecular film polymer consisting of a monomolecular film and having a trans-polyacetylenic bond.

Figure 2A:
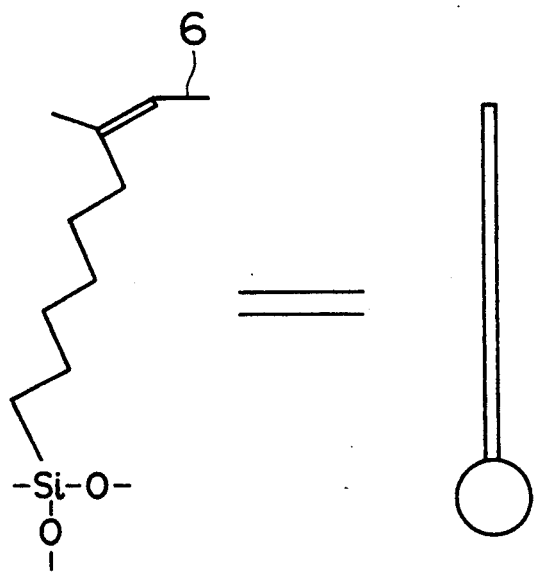
FIG. 2A is a schematic cross-sectional view of the state of molecules polymerized after adsorption.

In the figures, the numbers have the following meanings: 1: substrate, 1a: lattice-shaped substrate, 2: monomolecular film, 3: trans-polyacetylenic bond, 4: monomolecular polymer film, 5: permselective film composed of a monomolecular polymer film, 6: molecules of a silane compound, 7: diacetylene group, 8: polydiacetylenic bond, 9: monomolecular built-up polymer film, and 10: permselective membrane composed of a monomolecular built-up polymer film.

DETAILED DESCRIPTION OF PREFERRED EMBODIMENTS

According to the present invention, a monomolecular polymer film of several tens of angstroms of magnitude can be obtained by forming a monomolecular film by chemisorption using of a linear hydrocarbon derivative having a functional group such as $SiX_lR_m$ (wherein X is a halogen atom; R is a hydrogen atom or a lower alkyl group having 1 to 6 carbon atoms; each of l and m is an integer of 1 to 3 or zero, and $l+m \geq 3$) and at least one polymerizable group such as vinyl group, acetylenic group, diacetylenic group, etc., and carrying out a polymerization. It is also possible to form a built-up film by making the aforesaid monomolecular film hydrophilic, repeating the above procedure, and thereby building up a plurality of the monomolecular films into a film.

That is, the present invention was made on the basis of the following finding. An ultrathin film in a state of monomolecular polymer film or monomolecular built-up polymer film which is stable even in oxygen-containing atmosphere and is free from pinholes, can be formed by immersing a monomolecular film or a monomolecular built-up film formed on a hydrophilic substrate by the above method in an organic solvent containing a catalyst such as metal halide catalyst, or irradiating the same with radiation, and thereby subjecting the polymerizable group portion in monomolecular film to a polymerization, followed by removing a portion of the substrate by etching from the side reverse to the monomolecular film or the monomolecular built-up film. Thus, a permselective membrane which is excellent in selective-permeation efficiency can be produced.

In other words, a permselective membrane which is excellent in selective-permeation efficiency can be produced by polymerizing molecules of a monomolecular film while maintaining a definite orientation thereof by utilizing chemisorption.

Furthermore, the present invention is effective also in that the permeability can optionally be chosen by controlling the number of monomolecular layers.

According to the present invention, it is also possible to form a polymer of ultrathin film form by spreading on water surface a solution of a substance having at least one polymerizable group and a functional group dissolved in an organic solvent, evaporating the organic solvent, gathering up molecules of said substance which remain on the water surface, in the water surface direction on the water surface with a barrier, moving the substrate upward and downward while applying a predetermined surface pressure with the barrier, thereby building up monomolecular films of said substance into a film on the substrate (this building-up method is referred to as "Langmuir-Blodgett (LB) technique", and monomolecular films built up into a film by this method is referred to as "LB films"), and then subjecting the polymerizable group portion in the monomolecular films to polymerization by immersing the substrate having the monomolecular films built up thereon in an organic solvent containing a catalyst such as metal halide catalyst, or irradiating the same with radiation.

Also in this case, a permselective membrane which is excellent in selective-permeation efficiency can be produced by polymerizing molecules of the monomolecular films while maintaining a definite orientation thereof.

Moreover, the present invention is effective also in that the permeability can also optionally be chosen by controlling the number of monomolecular films built up into a film.

Application of a DC bias in the surface direction during the building-up of the aforesaid LB films into a film permits the production of a permselective film even better in orientation and hence is preferable.

In addition, the present inventors found that a desired selective permeability can be imparted by carrying out replacement by an alcoholic hydroxyl group (—OH) or an ionic functional group in the surface of an ultrathin film in a state of monomolecular film polymer or monomolecular built-up film polymer by subjecting the surface to physical treatment or chemical treatment.

According to the present invention, a monomolecular film of, for example, a substance having an acetylenic group as the polymerizable group and a chlorosilyl group as the functional group can be formed on a substrate having a hydrophilic surface, in a state in which molecules of the substance are oriented, by immersing the substrate in a nonaqueous organic solvent containing said substance dissolved therein, and forming a monomolecular film of the substance on the substrate by chemisorption. Further, an ultrahigh-molecular-weight polymer can be produced while maintaining the molecular orientation, by subjecting the monomolecular film of said substance formed on said substrate to polymerization using a catalyst.

Examples of the substance having at least one polymerizable group and a functional group which is used in this invention for forming a permselective membrane, include polymerizable substances containing in the molecule at least one unsaturated group such as vinyl group (—C=C—) or acetylenic group (—C≡C—) as a polymerizable group. Examples of the functional group contained in these substances include functional groups of the formula —SiX$_l$R$_m$— (wherein X is a halogen atom; R is a hydrogen atom or a lower alkyl group having 1 to 6 carbon atoms; each of l and m is an integer of 1 to 3 or zero, and $l+m \geq 3$), carboxyl group, etc.

Among them a chlorosilyl group (—SiCl$_n$H$_{3-n}$ wherein n is an integer of 1 to 3), a trimethylsilyl group (—Si(CH$_3$)$_3$ or —SiMe$_3$) or a carboxyl group is preferable.

Such substances as described above include, for example, ω-alkylynoictrichlorosilanes (acetylene derivatives) containing an acetylenic group at the terminal of the formula:

HC≡C—(CH$_2$)$_n$—SiCl$_3$ (wherein n is an integer of 14 to 24), 1-(trialkylsilyl)-ω-alkylynoictrichlorosilanes of the formula:

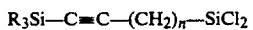

R$_3$Si—C≡C—(CH$_2$)$_n$—SiCl$_2$ (wherein R and n are as defined above), trichlorosilane compounds having a diacetylenic group (—C≡C—C≡C—) of the formula:

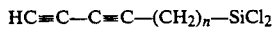

HC≡C—C≡C—(CH$_2$)$_n$—SiCl$_2$ (wherein n is as defined above), and trichlorosilane compounds having an ethylenic group (—CH=CH—) of the formula:

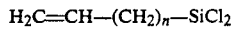

H$_2$C=CH—(CH$_2$)$_n$—SiCl$_2$ (wherein n is as defined above).

In this invention, there can also be used compounds having an acetylenic group as polymerizable group and COOH as functional group, for example, acetylene derivatives of the formula:

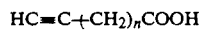

HC≡C—(CH$_2$)$_n$COOH wherein n is as defined above. Needless to say, there can also be advantageously used compounds in which —SiCl$_3$ is linked in place of the acetylenic group at the terminal.

In addition, a monomolecular film may be subjected to suitable modification after being formed by the use of the above-exemplified substance. Examples of modifying agent are compounds which permit introduction of the epoxy group of 3-chloropropyrene oxide, or the like by which the hydrogen atom of a group such as —SiHR$_2$ at the terminal can be replaced. Usually, an ammonia is formed after epoxidation to introduce an amino group, whereby the modification is completed.

The formation of a monomolecular film is conducted by dissolving the above-exemplified substance in an organic solvent, immersing a hydrophilic, porous substrate in the resulting solution, and then carrying out polymerization.

As the organic solvent, any one can be used in this invention so long as it is capable of dissolving the above-exemplified compound, though suitable solvents include, for example, n-paraffin solvents such as n-hexadecane, etc. and halogenated hydrocarbon compounds such as carbon tetrachloride, chloroform, etc. Mixtures of them can, of course, be used.

For producing a monomolecular film, the above-exemplified compound is used after being dissolved in the solvent to a concentration of approximately $1.0 \times 10^{-3} - 8.0 \times 10^{-3}$ mol/liter.

Although the immersion time of the porous substrate is varied depending on the compound, an immersion time of several tens of seconds to several minutes is sufficient.

For forming a uniform monomolecular film, the immersion is conducted preferably in a dried nitrogen stream.

The polymerization may be carried out using either a catalyst or radiation.

Examples of the catalyst used for the polymerization include metal halide catalysts such as $MoCl_5$, $WCl_6$, $NbCl_5$, $TaCl_5$, etc. and metal carbonyl catalysts such as $Mo(Co)_5$, $W(Co)_6$, $Nb(CO)_5$, $Ta(CO)_5$, etc. As an organic solvent for dissolving these catalysts, there can be used toluene, dioxane, anisole, etc. A very stable ultra-thin film in a state of monomolecular polymer film or monomolecular built-up polymer film can be formed by removing a portion of the aforesaid substrate by etching from the side on which no monomolecular film has been formed, after the polymerization.

UV light, X-rays, electron beams, γ-rays, etc. can serve as the radiation usable for the polymerization there may be exemplified UV light, X-rays, electron beams, γ-rays, etc.

Any substrate may be used so long as it has a hydrophilic surface, and there examples thereof are substrates made of metals, glass, or ceramics.

A permselective membrane can be obtained while adhering to a lattice-shaped substrate, by removing a portion of the substrate by etching using, for example, photolithography, selectively (for instance, so as to form the substrate into a lattice shape) from the side of substrate on which no monomolecular polymer has been formed (the same applied to the case of building up).

EXAMPLES

The present invention is explained below in detail with reference to Examples.

EXAMPLE 1

In this example, as a substance for forming a monomolecular film, there was used ω-nonadecylynoictrichlorosilane (hereinafter abbreviated as NCS in some cases) of the formula:

(wherein n is n=17) which is an acetylene derivative and contains an acetylenic group at the terminal.

A silane-type surfactant NCS (n=17):

was chemisorbed on a hydrophilic substrate 1 (glass, metal, ceramic, or the like) of 0.1 to 0.5 mm in thickness to form a monomolecular film on a surface of the substrate 1. In this case, the chlorosilyl group ($-SiCl_3$) of the silane-type surfactant NCS reacted with a hydroxyl group (—OH) existing on the surface of the substrate 1 to form a monomolecular film 2 having the structure:

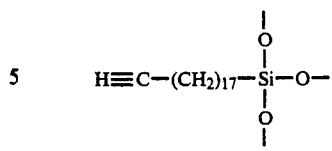

on the surface of the substrate 1. For example, when a hydrophilic, porous substrate was immersed in a solution prepared by dissolving the silane-type surfactant NCS in a mixture of 80% of n-hexadecane, 12% of carbon tetrachloride and 8% of chloroform to a concentration of $1.0 \times 10^{-3} - 8.0 \times 10^{-3}$ mol/liter, at room temperature for several minutes, a —Si—O— bond could be formed on the surface of the substrate 1 (FIG. 1A). The same result can be obtained when n is any of integers 14 to 24.

It was confirmed by FT-IR that a monomolecular film 2 having the structure:

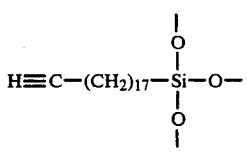

had been formed on the surface of the porous substrate 1.

In this case, the formation of the monomolecular film 2 was conducted under a humidity-free nitrogen atmosphere.

Then, the substrate 1 on which one layer of the monomolecular film 2 had been formed was immersed in a solution of a molybdenum pentachloride ($MoCl_5$) catalyst dissolved in toluene and the solution was heated to approximately 30°–70° C. Consequently, a monomolecular film polymer 4 having a trans-polyacetylenic bond 3 was produced by the reaction shown in FIG. 1B. Its production was ascertained by FT-IR.

In addition, when $WCl_6$, $NbCl_5$, $TaCl_5$ or the like was used as a catalyst, similar monomolecular films which had undergone polymerization reaction were obtained though they were different in molecular weight of polymer.

Furthermore, when the substrate 1 on which one layer of the monomolecular film 2 had been formed was immersed in a solution of $Mo(CO)_6$ or $W(CO)_6$ catalyst dissolved in carbon tetrachloride, and irradiated with UV light, there were obtained reddish-brown monomolecular films which had undergone polymerization reaction and were different in molecular weight of polymer depending on the catalyst.

Figure 2B:
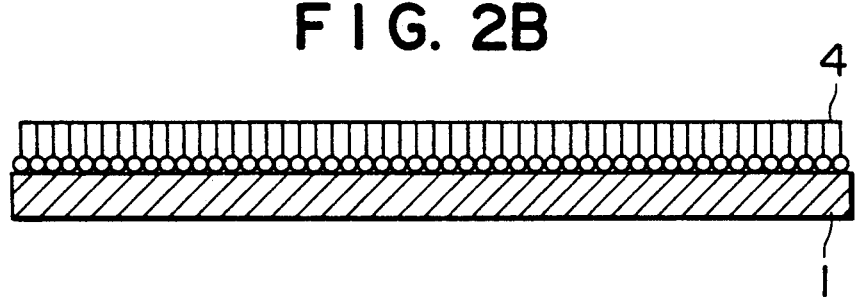
FIGS. 2B and C are schematic views of the steps of the production of a permselective membrane consisting of a monomolecular film and having a trans-polyacetylenic bond.
Figure 2C:
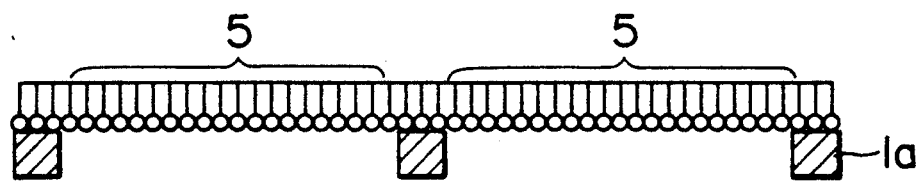

Then, as shown in FIG. 2, a portion of the hydrophilic substrate 1 on which the monomolecular film polymer 4 had been formed (FIG. 2B) was removed by etching using photolithography, selectively (for example, so as to form the substrate into a lattice shape) (when the substrate is made of glass, the removal can easily be conducted using hydrofluoric acid) from the side on which the monomolecular film 4 had not been formed, whereby a permselective membrane composed of a monomolecular film polymer was obtained while being attached to lattice-shaped substrate 1a (FIG. 2C). Molecules 6 of the silane-type surfactant which were polymerized after adsorption are schematically shown in FIG. 2A.

EXAMPLE 2

Figure 3A:
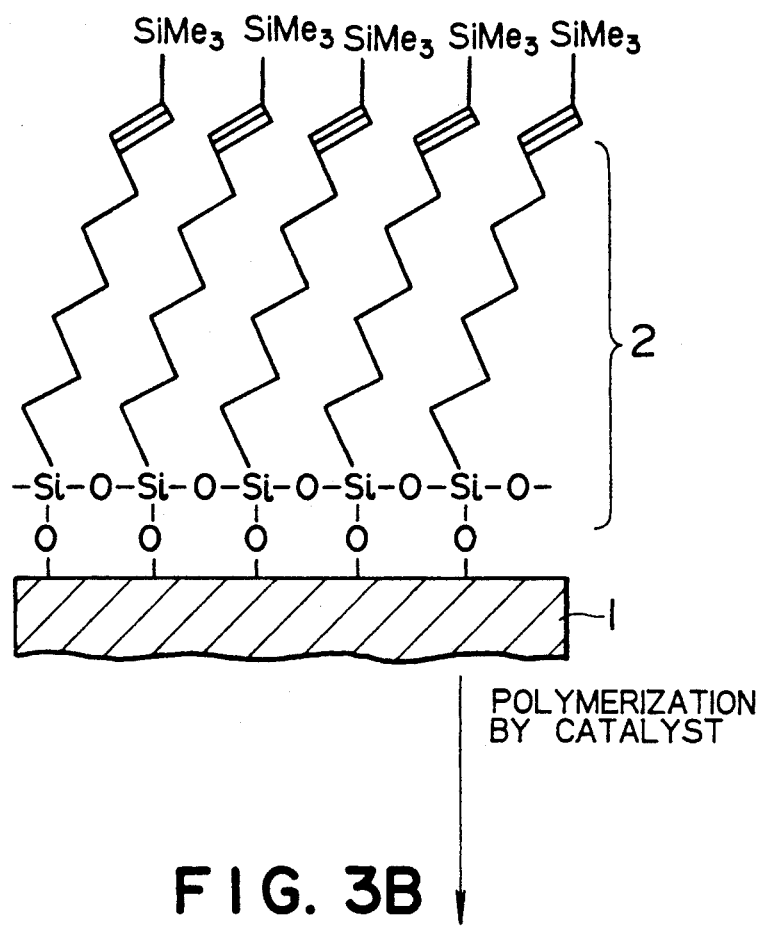
FIGS. 3A and B are a schematic view of the steps of the production of a permselective membrane consisting of a monomolecular film and having a trans-polyacetylenic bond.
Figure 3B:
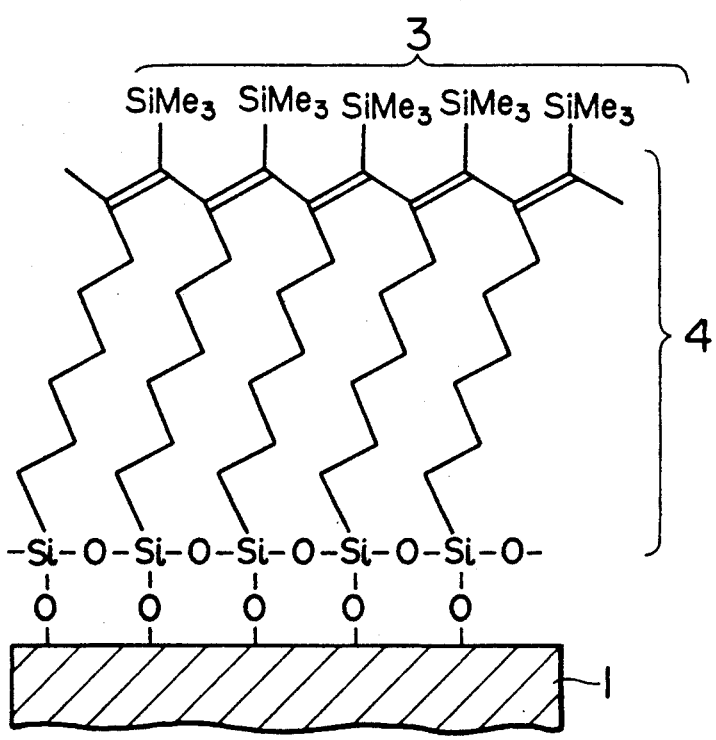

A monomolecular film 2 of 1-(trimethylsilyl)-ω-nonadecylynoictrichlorosilane (hereinafter abbreviated as TMS-NCS):

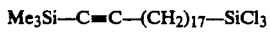
$$Me_3Si-C\equiv C-(CH_2)_{17}-SiCl_3$$

was formed on the aforesaid hydrophilic substrate 1. The substrate 1 thus treated (FIG. 3A) was immersed in a solution of a tungsten hexachloride (WCl$_6$) catalyst and a tetrabutyltin (Bu$_4$Sn) co-catalyst dissolved in the ratio of 1:1 in toluene, and the solution was heated to approximately 30°–70° C. Consequently, a monomolecular film polymer 4 containing trimethylsilyl groups (—SiMe$_3$) and a trans-polyacetylenic bond 3 was produced by the reaction shown in FIG. 3B.

Further, a cis-polyacetylenic bond was also formed when the hydrophilic substrate having one layer of the TMS-NCS monomolecular film formed thereon was immersed in a solution of a molybdenum pentachloride (MoCl$_5$) catalyst dissolved in anisole, an organic solvent containing an oxygen atom in the molecule, and the solution was heated to approximately 30°–70° C.

In addition, a cis-polyacetylenic bond in a state of a monomolecular film containing trimethylsilyl groups (—SiMe$_3$) was formed when the hydrophilic substrate having one layer of the TMS-NCS monomolecular film formed thereon was immersed in a solution of a molybdenum pentachloride (MoCl$_5$) catalyst and a triphenylbismuth (Ph$_3$Bi) co-catalyst dissolved in the ratio of 1:1 in anisole, an organic solvent having an oxygen atom in the molecule, and the solution was heated to approximately 30°–70° C.

Then, as shown in FIG. 2, a portion of the substrate 1 on which the monomolecular film 4 had been formed was removed by etching using photolithography, selectively (for example, so as to form the substrate into a lattice shape), whereby a permselective membrane 5 composed of the monomolecular polymer film having a different density was obtained while being attached to lattice-shaped substrate 1a.

It was confirmed that the monomolecular film formed in the manner described above was insoluble in alcohols.

Although a method in which a monomolecular film was subjected to polymerization using a catalyst was described in the above examples, a polyacetylene-type monomolecular film polymer could easily be produced also by irradiation with radiation such as electron beams, X-rays, γ-rays, etc. under helium though a choice could not be made between cis and trans forms. In this case, it could be confirmed that irradiation in large excess permits the production of a polyethylene-type monomolecular polymer film crosslinked in a two-dimensional direction.

Moreover, the polyacetylene-type monomolecular polymer film thus produced was much more stable to heat, pressure, UV light, etc. even in an oxygen-containing atmosphere than those produced conventionally by a Ziegler-Natta type catalyst method.

From the results described above, it was confirmed that a permselective membrane composed of a cis- or trans-polyacetylene type monomolecular polymer film can easily be formed by the process of the present invention.

In the above examples, only NCS and TMS-NCS were described as substances for producing a monomolecular film, but although different conditions should be employed, the same method as described above is applicable to any other substance so long as the substance contains in the molecule at least one unsaturated group such as vinyl group (—C=C—) or acetylenic group (—C≡C—) and can be formed into a monomolecular film.

EXAMPLES 3 AND 4

Figure 4A:
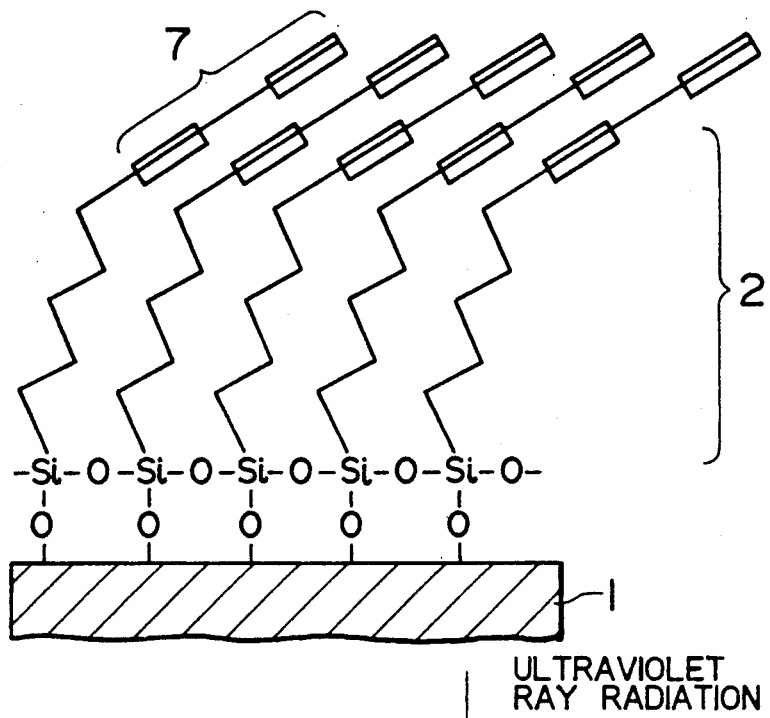
FIGS. 4A and B are a schematic view of the steps of the production of a permselective membrane consisting of a monomolecular film of a diacetylene derivative and having a polydiacetylenic bond.
Figure 4B:
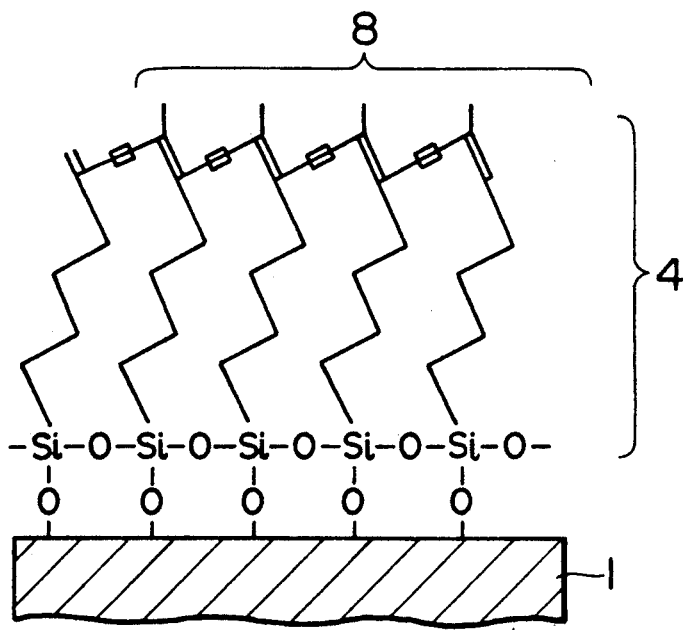

When tricosadiynoictrichlorosilane having one diacetylenic group 7 of the formula:

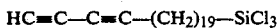
$$HC\equiv C-C\equiv C-(CH_2)_{19}-SiCl_3$$

was treated in the same manner as described in Example 1, a monomolecular polymer film 4 having a polydiacetylenic bond 8 could be obtained by UV light irradiation (100 mJ/cm$^2$), as shown in FIG. 4.

When nonadecenyltrichlorosilane of the formula:

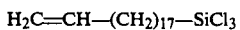
$$H_2C=CH-(CH_2)_{17}-SiCl_3$$

was used, a monomolecular polymer film having a polyethylenic bond could be obtained by electron beam irradiation (50 mJ/cm$^2$).

Polymerization may be carried out after a plurality of monomolecular films are built up into a film. A permselective membrane in a state of a monomolecular built-up polymer film can be produced also by conducting the formation of a monomolecular film and its polymerization continuously and alternately.

EXAMPLE 5

Figure 5A:
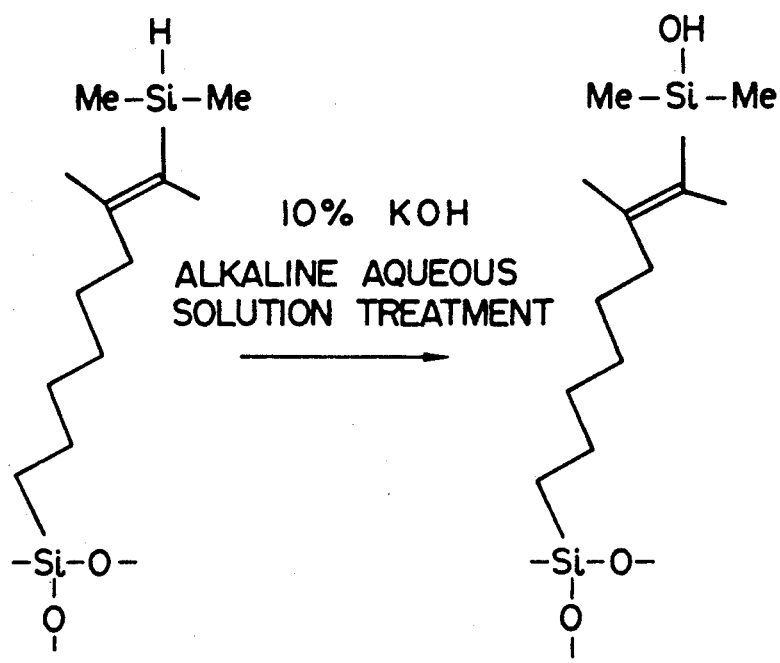
FIGS. 5A, B and C are a schematic view of the steps of the production of a permselective membrane consisting of a monomolecular built-up film and having a polyacetylenic bond and a modified surface.

The aforesaid substrate 1 on which a monomolecular film of 1-(dimethylsilyl)-ω-nonadecynyltrichlorosilane (hereinafter abbreviated as DMS-NCS) of the formula:

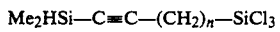
$$Me_2HSi-C\equiv C-(CH_2)_n-SiCl_3$$

had been formed, was immersed in a solution of a tungsten hexachloride (WCl$_6$) catalyst and a tetrabutyltin (Bu$_4$Sn) co-catalyst dissolved in the ratio of 1:1 in toluene. The solution was heated to approximately 30°–70° C. to carry out the polymerization, after which the monomolecular film was treated with a strong alkali (10% KOH) at 30° C. for 2 hours to carry out the reaction shown in FIG. 5A, whereby H of the terminal silyl group of

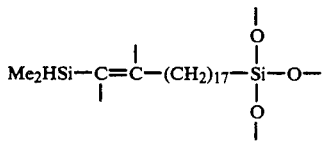

was converted to a OH group.

Figure 5B:
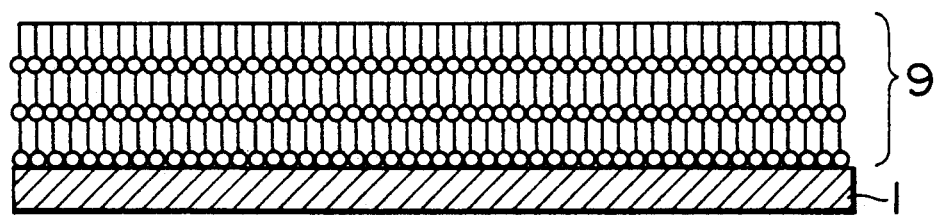

Then, this step, an adsorption step and a polymerization step were repeated a plurality of times to obtain the monomolecular built-up polymer 9 shown in FIG. 5B.

Figure 5C:
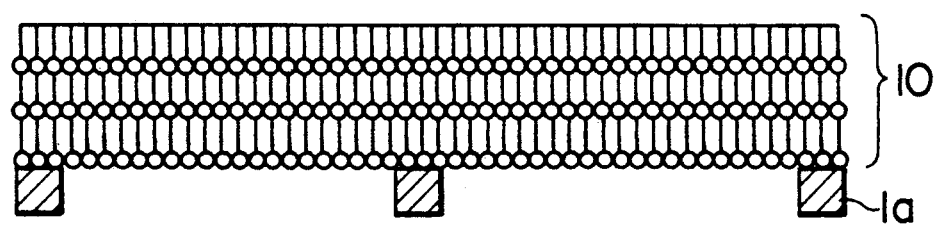

Subsequently, in the same manner as shown in FIG. 3C, a portion of the substrate 1 on which the monomolecular built-up polymer film 9 had been formed was removed by etching using photolithography, selectively (for example, so as to form the substrate into a lattice shape) from the side on which the monomolecular built-up polymer film had not been formed, whereby a permselective membrane 10 composed of monomolecular built-up polymer film having a different density was obtained while being attached to lattice-shaped substrate 1a (FIG. 5C). The same result can be obtained when n is any of integers 14 to 24.

EXAMPLE 6

A monomolecular film or a monomolecular built-up film was formed on a hydrophilic substrate by the LB technique by the use of an acetylene derivative, ω-tricosynoic acid (hereinafter abbreviated as TCA) of the formula:

$$HC{\equiv}C{-}(CH_2)_{20}{-}COOH$$

and subjected to polymerization by irradiation with radiation such as electron beams, UV light, X-rays, γ-rays or the like (usually at a dose of approximately 5–50 mJ/cm$^2$) in an inert gas atmosphere. Then, a portion of the substrate on which a monomolecular polymer film or a monomolecular built-up polymer film had been formed was removed by etching using lithography, selectively (for example, so as to form the substrate into a lattice shape) from the side on which the monomolecular polymer film or the monomolecular built-up polymer film had not been formed, whereby a permselective membrane composed of the monomolecular polymer film or the monomolecular built-up polymer film which had a different density was obtained while being attached to lattice-shaped substrate. Substantially the same result can be obtained when n is any of integers 14 to 24.

Although a description was given only for ω-tricosynoic acid in the above, it will be clear that although the building-up conditions should be changed, the same method as described above is applicable to any other material so long as the material contains a diacetylenic group, an acetylenic group, a vinyl group or the like in the molecule and can be formed into a LB film. When pentacosadiynoic acid having one diacetylenic group was used, a polydiacetylenic bond could be obtained by UV irradiation (100 mJ/cm$^2$).

Although a method in which the polymerization was carried out after forming only one LB film was described in the above, polymerization may be carried out after building up a plurality of LB films into a film. It was confirmed that a permselective membrane in a state of monomolecular built-up polymer film can be formed also by conducting building-up and polymerization alternately.

In addition, after forming a monomolecular film or a monomolecular built-up film of a substance containing at least one polymerizable group and a functional group on a hydrophilic substrate surface and subjecting the polymerizable group to polymerization by means of a catalyst or radiation irradiation, the surface can be modified by chemical treatment or physical treatment. For example, in the modification, an alcoholic hydroxyl group (—OH) can be added to the surface by treating the surface in oxygen gas plasma (treatment at about 100 W for about 5 minutes is sufficient).

In the modification, for example, after converting H of the terminal silyl group of a monomolecular film having the formula:

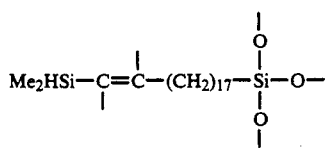

to a OH group, immersing the monomolecular film in a solution of butyllithium dissolved in hexane, and then reacting a compound of the formula:

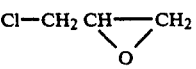

with the thus treated monomolecular film to epoxidize the aforesaid terminal, an amino group (anionic functional group) could be added to the terminal shown below, by treatment with an aqueous ammonia:

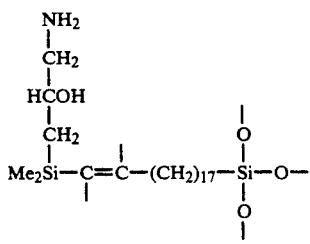

Employment of the production process of the present invention permits the highly efficient production of a permselective membrane in a state of monomolecular polymer film or monomolecular built-up polymer film which has few pinholes, has a thickness of tens to hundreds of angstroms, is excellent in molecular orientation, and is stable. Therefore, it can yield a film having a high permeability to gases and liquids, which is very effective as a permselective membrane. For example, in the case of a film formed by the use of TMS-NCS or TMS-TCA, there can be obtained a permselective membrane having very remarkable ability to separate oxygen from air and a selection ratio of 10 or more. It seems to become possible to produce permselective membranes having their individual permeabilities adjusted to be stepwise, by choosing a suitable acetylene or diacetylene derivative as starting material and suitable production conditions. It is also possible to further improve the selective permeability of a permselective film by modifying its surface.

What is claimed is:

1. A permselective membrane in a state of monomolecular film polymer or monomolecular built-up polymer, which comprises a polymer formed by subjecting a monomolecular film or a monomolecular built-up film of a substance containing at least one polymerizable group and a functional group to polymerization by means of a catalyst or radiation irradiation.

2. A permselective membrane according to claim 1, wherein the polymerizable group is a vinyl group, an acetylenic group or a diacetylenic group.

3. A permselective membrane according to claim 2, wherein a trimethylsilyl (—SiMe$_3$) group is linked to the acetylenic group.

4. A permselective membrane according to claim 1, wherein the functional group is a carboxyl group (—COOH) or a chlorosilyl group (—SiCl$_n$H$_{3-n}$ wherein n is an integer of 1 to 3).

5. A permselective membrane according to claim 4, wherein the substance containing at least one polymerizable group and a functional group is ω-nonadecynyltrichlorosilane.

6. A permselective membrane according to claim 4, wherein the substance containing at least one polymerizable group and a functional group is 1-(trimethylsilyl)ω-nonadecylynoictrichlorosilane.

7. A permselective membrane according to claim 1, wherein replacement by an alcoholic hydroxyl group (—OH) or an ionic functional group has been carried out in the surface of the monomolecular polymer film or the monomolecular built-up polymer film.

8. A process for producing a permselective membrane comprising a step of forming a monomolecular film or monomolecular built-up film of a substance containing at least one polymerizable group and a functional group on a hydrophilic substrate surface, a step of subjecting the polymerizable group to polymerization by means of a catalyst or radiation irradiation, and a step of removing a portion of the substrate by etching from the side on which neither monomolecular film nor monomolecular built-up film has been formed.

9. A process for producing a permselective membrane according to claim 8, wherein chemisorption is employed in the step of forming the monomolecular film or the monomolecular built-up film.

10. A process for producing a permselective membrane according to claim 8, wherein the Langmuir-Blodgett (LB) technique is employed in the step of forming the monomolecular film or the monomolecular built-up film.

11. A process for producing a permselective membrane according to claim 10, wherein the Langmuir-Blodgett technique is practiced while applying a direct-current voltage in the surface direction on water surface.

12. A process for producing a permselective membrane according to claim 8, wherein the catalyst contains Mo, W, Nb or Ta.

13. A process for producing a permselective membrane according to claim 8, wherein the catalyst comprises a metal halide catalyst and an organic tin or bismuth compound as co-catalyst.

14. A process for producing a permselective membrane according to claim 8, wherein the radiation is electron beams, X-rays or γ-rays.

15. A process for producing a permselective membrane comprising a step of forming a monomolecular film or monomolecular built-up film of a substance containing at least one polymerizable group and a functional group on a hydrophilic substrate surface, a step of subjecting the polymerizable group to polymerization by means of a catalyst or radiation polymerization, a step of modifying the surface of the monomolecular film or the monomolecular built-up film by chemical treatment or physical treatment, and a step of removing a portion of the substrate by etching from the side on which neither monomolecular film nor monomolecular built-up film has been formed.

16. A process for producing a permselective membrane according to claim 15, which further comprises a step of modifying the surface of the monomolecular film or monomolecular built-up film after the polymerization by adding an alcoholic hydroxyl group (—OH) or an ionic functional group to the surface.

* * * * *